United States Patent
Cheng

(10) Patent No.: US 8,916,256 B2
(45) Date of Patent: Dec. 23, 2014

(54) FASTENING STRAP, FOAM ARTICLE INCLUDING SAME AND METHOD FOR MANUFACTURING THE FASTENING STRAP

(71) Applicant: Taiwan Paiho Limited, Chang Hwa Hsien (TW)

(72) Inventor: Allen Cheng, Chang Hwa Hsien (TW)

(73) Assignee: Taiwan Paiho Limited, Chang Hwa Hsien (TW)

( * ) Notice: Subject to any disclaimer, the term of this patent is extended or adjusted under 35 U.S.C. 154(b) by 168 days.

(21) Appl. No.: 13/749,927

(22) Filed: Jan. 25, 2013

(65) Prior Publication Data
US 2013/0196110 A1    Aug. 1, 2013

(30) Foreign Application Priority Data
Feb. 1, 2012    (TW) ............................... 101103246 A

(51) Int. Cl.
  *A44B 18/00*    (2006.01)
  *B29C 45/14*    (2006.01)
  *B60N 2/58*    (2006.01)

(52) U.S. Cl.
  CPC ............. *A44B 18/0069* (2013.01); *B29C 45/14* (2013.01); *B60N 2/5833* (2013.01); *A44B 18/0076* (2013.01)
  USPC ................................ 428/100; 428/99; 24/442

(58) Field of Classification Search
  USPC ...................... 428/99, 100, 34.1; 24/442, 452
  See application file for complete search history.

(56) References Cited

FOREIGN PATENT DOCUMENTS

JP    H07186160 A    7/1995
WO    95/01863 A1    1/1995

OTHER PUBLICATIONS

The search report for European Patent Application No. EP 10011763.9, dated Apr. 24, 2013.

*Primary Examiner* — Alexander Thomas
(74) *Attorney, Agent, or Firm* — Bacon & Thomas, PLLC

(57) ABSTRACT

One aspect of the present invention provides a fastening strap for used in a foam article. The sideway-bendable fastening strap for a foam article includes a substantially flat hollow helical body made from a single hook strap and having a first outer surface, a second outer surface, and a plurality of hooks integrally formed on each of the first and second outer surfaces; wherein the hook strap is formed by plastic injection process and has a substrate and a plurality of hooks integrally formed on one face of the substrate, and wherein the hollow helical body is formed by sequentially and continually folding the hook strap from one end of the hook strap toward the other end of the hook strap along a number folding lines which are parallel with each other and at an angle θ with respect to a longitudinal axis of the hook strap with the face having the hooks formed thereon facing outward such that the hook strap is plastically and permanently deformed at the folding lines to form a hollow helical body having a width w.

3 Claims, 4 Drawing Sheets

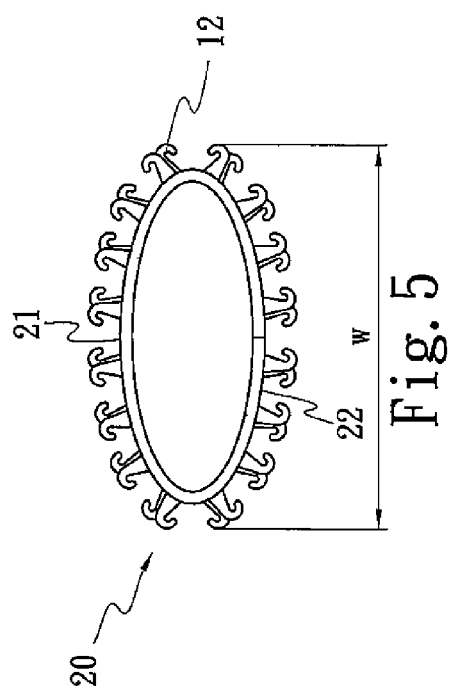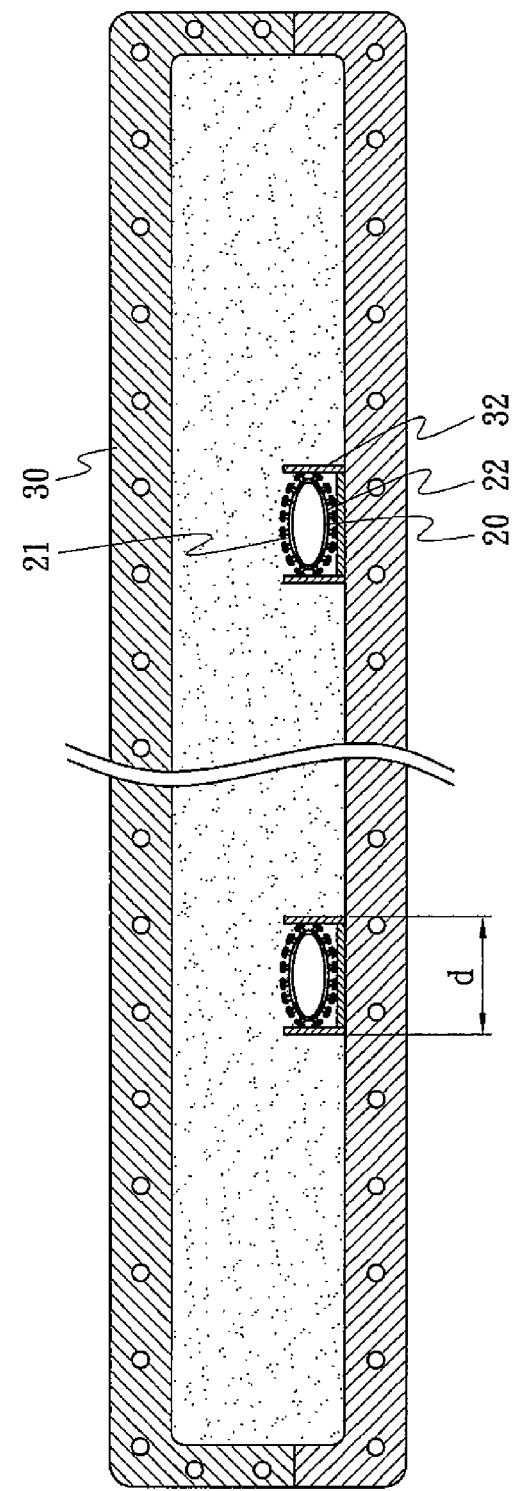

FASTENING STRAP, FOAM ARTICLE INCLUDING SAME AND METHOD FOR MANUFACTURING THE FASTENING STRAP

FIELD OF THE INVENTION

The present invention relates generally to a sideway-bendable fastening strap for used in a foam article, a foam article (such as, a seat cushion or the like) including the fastening strap, and a method for manufacturing the fastening strap.

BACKGROUND OF THE INVENTION

A hook-and-loop fastener is a well-know type of fastener and because of its easy engaging/disengaging characteristic it is wildly adapted in a wide variety of fields that need to detachably fasten two articles together. For instance, as shown in FIG. 1, a hook-and-loop type fastening strap 1 used in a seat cushion of a car or a seat cushion of a sofa for detachably fastening a seat coverings (not shown) to a seat includes a substrate 2 made of a material that allow foam material to penetrate into the voids of the substrate material, such as non-woven fabric or fibrous fabric. This hook-and-loop type fastening strap 1 further includes a magnetic material layer 3 coated on the substrate 1 and a fastening member 4 bonded to the magnetic material layer 3. The fastening member 4 has a plurality of hooks 5 formed thereon and has a width narrower than that of the substrate 2. The substrate 2 has two longitudinal sidewalls 6 each formed along the sides of the fastening member 4 and having a height greater than a height of the hooks 5, so as to prevent the foam material from entering the spaces between the hooks 5 during a foaming process of a seat cushion manufacturing.

Another form of hook-and-loop type fastening strap 1' used in a seat cushion is shown in FIG. 2 and includes a substrate 2, a magnetic material layer 3, and a fastening member 4. Instead of having two protective sidewalls, this fastening strap 1' includes a protective layer 7 that directly and detachably engages with the hooks 5 of the fastening member 4 to provide a protective function that prevents the foam material from entering the spaces between the hooks 5 during the foaming process of a seat cushion manufacturing.

Although the above-mentioned hook-and-loop type fastening straps used in a seat cushion of a car or a seat cushion of a sofa may provide a function of detachably fixing the seat coverings onto a seat cushion, they have drawbacks and application limitations. For instance, the fixing between the above-mentioned prior art fastening straps and the seat cushion is provided merely by the joining force created by the penetration of the foam material into the voids of the substrate material, and thus an unexpected separation between the fastening straps and the seat cushion may occur due to insufficient joint force therebetween.

Additionally, because the above-mentioned prior art fastening straps are unable to bend or curve sideway, they can only be used in seat cushions that have substantially straight fixing grooves. For seat cushions having curved fixing grooves, extra processes need to be taken to allow the above-mentioned prior art fastening straps to be applied. For instance, additional cutting molds having specific curvatures that match with the curvatures of the curved fixing grooves of a specific seat cushion to which the fastening straps are to be applied need to be developed to cut the fastening straps into shapes having desired curvatures. However, this is not cost effective because a specific cutting mold needs to be developed for a curved fixing groove of a seat cushion, and if there are a number of curved fixing grooves of different curvatures in one seat cushion then a number of different cutting molds are needed to cut the fastening straps into desired shapes. Thus, the applicability of the prior art fastening straps is limited.

Moreover, traditional fastening straps are laminated structures and usually include a substrate layer, a magnetic material layer, a hook strap layer and a protection layer. Therefore, it is complex to manufacture and the manufacturing costs are high.

Therefore, there exists a need in seat cushion industry for a fastening strap that is able to provide a strong bonding between the fastening strap and the seat cushion, is capable of bending or curving sideway so as to be applicable to seat cushions having straight and curved fixing grooves without any extra processes, and has a simple structure that is easy and inexpensive to manufacture.

SUMMARY OF THE INVENTION

In view of the above-mentioned disadvantages/problems associated with the existing fastening straps used in a seat cushion, one object of the present invention is to provide a fastening strap used in a foam article that is able to provide a strong bonding between the fastening strap assembly and the seat cushion, and is capable of bending or curving sideway. Another object of the present invention is to provide a foam article that includes the fastening strap.

According to one aspect of the present invention, a fastening strap is provided which includes:

a substantially flat hollow helical body made from a single hook strap and having a first outer surface, a second outer surface, and a plurality of hooks integrally formed on each of the first and second outer surfaces;

wherein the hook strap is formed by plastic injection process and has a substrate and a plurality of hooks integrally formed on one face of the substrate, and wherein the hollow helical body is formed by sequentially and continually folding the hook strap from one end of the hook strap toward the other end of the hook strap along a number folding lines which are parallel with each other and at an angle θ with respect to a longitudinal axis of the hook strap with the face having the hooks formed thereon facing outward such that the hook strap is plastically and permanently deformed at the folding lines to form a hollow helical body having a width w.

According to one aspect of the present invention, a method of manufacturing a form article including at least one attachment portions is provided, which includes:

providing a foaming mold, in which at least one U-shaped grooves are provided at positions of the bottom of the mold corresponding to the at least one attachment portions of the foam article and each of the grooves has a width d;

fitting a fastening strap of the present invention in each of the grooves, wherein the width w of the fastening strap is selected such that the width d of the groove is smaller than the width w of the fastening strap such that when the fastening strap is fitted in the groove the fastening strap is compressed laterally and is kept in the groove by means of the returning force generated by the configuration of the hollow helical body of the fastening strap and the elasticity of the plastic material of the fastening strap; and injecting the foaming mold with a foam material to perform a foam molding process, in which the foam material penetrates into the space among hooks so as to firmly binding the fastening strap to the foam article to be formed and become the at least one attachment portion.

Features, advantages and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings, wherein:

FIG. 5 is a schematic end view of the fastening strap shown in FIG. 4;

FIG. 6 a schematic partial cross-sectional view of a mold for forming a seat cushion.

DETAILED DESCRIPTION OF THE INVENTION

Figure 4:
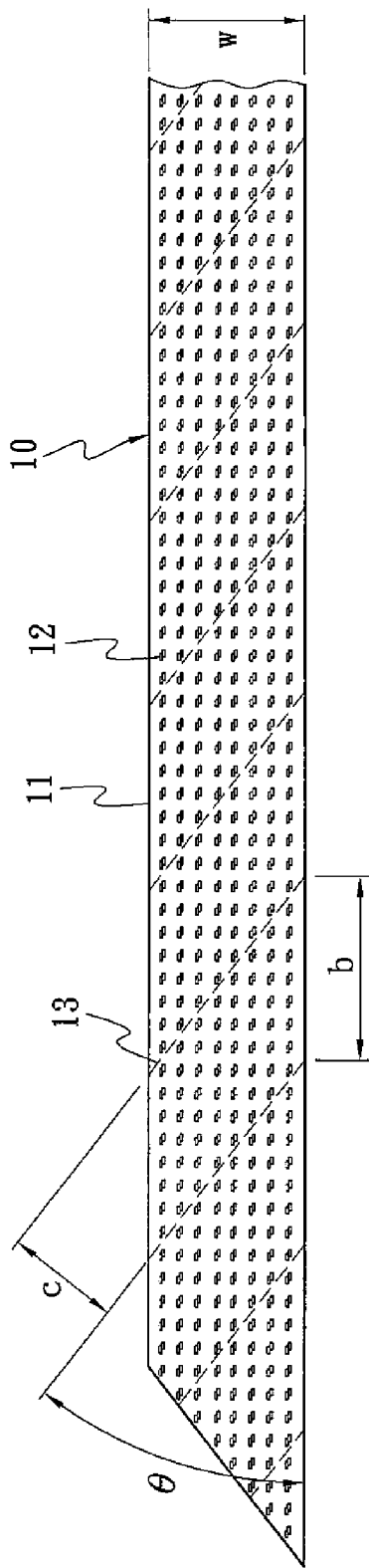
FIG. 4 is a schematic top plan view of the fastening strap shown in FIG. 3.
Figure 3:
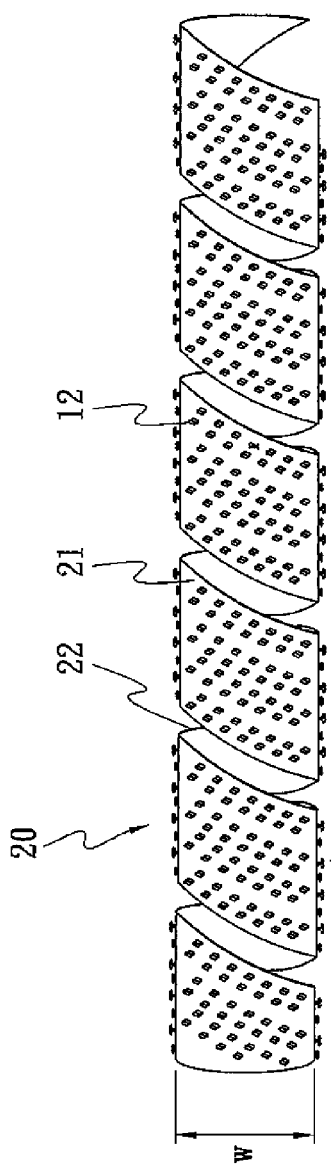
FIG. 3 is a schematic perspective view showing a fastening strap according to an embodiment of the present invention.

Referring now to FIGS. 3-5 to describe a method of manufacturing a fastening strap 20 according to an embodiment of the present invention and the fastening strap 20. First, a hook strap 10 with a width a is prepared by a plastic injection molding process. The hook strap 10 has substrate 11 and a plurality of hooks 12 integrally formed on one surface of the subject 11, as FIG. 3. Then, sequentially and continually folding the hook strap 10 from one end of the hook strap (e.g., the left end of FIG. 3) toward the other end of the hook strap 10 along a number oblique folding lines 13 which are parallel with each other and at an angle θ with respect to a longitudinal axis of the hook strap 10 (e.g., in the embodiment shown in FIG. 3, θ=45, degree) with the surface having the hooks formed thereon facing outward such that the hook strap 10 is plastically and permanently deformed at the folding lines 13 to form a hollow helical body of the fastening strap 20, as illustrated in FIG. 4. There is a spacing b between adjacent folding lines 13 along the longitudinal direction of the hook strap 10 and a distance c between adjacent folding lines 13 along a direction perpendicular to the folding lines 13. As illustrated in FIG. 5, the fastening strap 20 has a first outer surface 21 and a second outer surface 22 and both outer surfaces have a plurality of hooks 12 formed thereon. The fastening strap 20 has a width w and w=b×tan θ.

Figure 7:
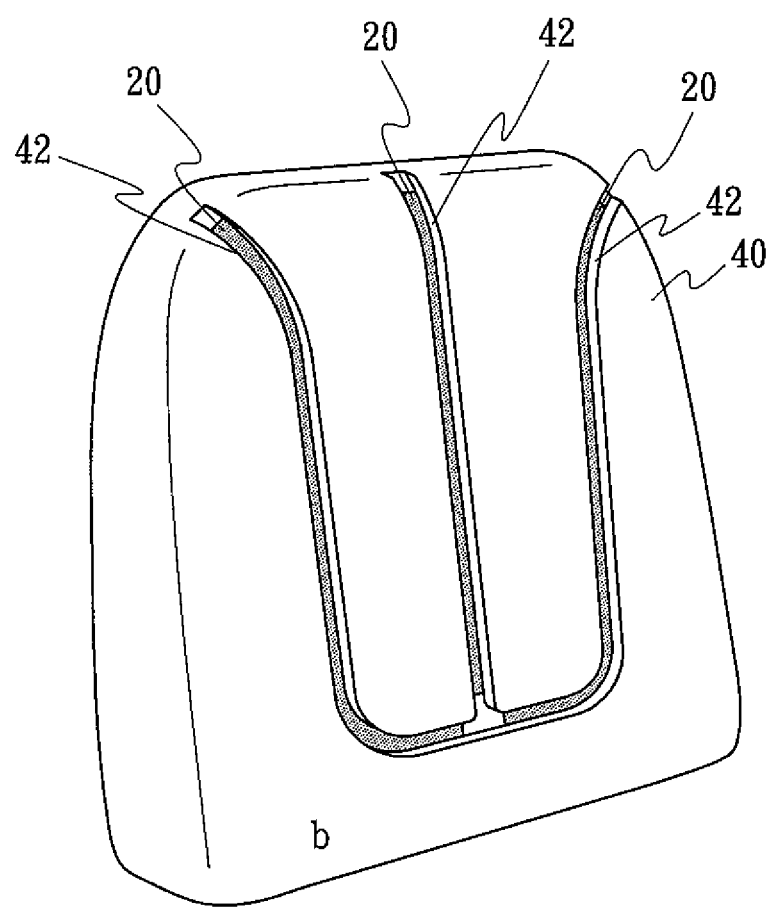
FIG. 7 is a schematic perspective view showing a seat cushion including the fastening strap assemblies of the present invention.

Next, a method for manufacturing a seat cushion 40 including a number of attachment portions 42 will be described by referring to FIGS. 6 and 7. First, a foaming mold 30 having at least one U-shaped grooves 32 being provided at positions of the bottom of the mold corresponding to the at least one attachment portions 42 of the seat cushion 40 is provided. Each of the grooves 32 has a width d which is substantially smaller than the width w of the fastening strap 20, i.e., d<<w. Then, fitting the fastening strap 20 of the present invention into each of the grooves 32 with the first outer surface 21 facing downward and the second outer surface 22 facing upward. When fitting the fastening strap 20 in the groove 32, the fastening strap 20 will be laterally compressed because the width d of the groove 32 is smaller than the width w of the fastening strap 20, and the fastening strap 20 may be kept in place in the groove 32 by means of the returning force generated by the configuration of the hollow helical body of the fastening strap 20 and the elasticity of the plastic material forming the fastening strap 20. Next, a foam material is injected into the mold 30 to perform a foam molding process and allow the foam material to penetrates into the space among hooks 12 on the second outer surface 21 of the fastening strap 20 so as to firmly binding the fastening strap 20 to the seat cushion 40 that is being formed and become the attachment portion 42, as illustrated in FIG. 7. Although in this embodiment a seat foam cushion 40 is used as an example to illustrate that the fastening strap of the present invention may be applied in a seat foam cushion, in fact, the fastening strap of the present application may be applied in any foam articles that are produced by foam molding process.

The fastening strap for used in a foam article of the present invention possess following advantages:

1. The fastening strap of the present invention has a simple structure and easy to produce, and thus the fastening strap of the present invention has an advantage in lowering manufacturing cost and simplify manufacturing process.

2. The fastening strap of the present invention has an unique hollow helical body structure and thus can be kept in place in the groove of the foaming mold merely by means of a returning force generated by the configuration of the hollow helical body of the fastening strap and the elasticity of the plastic material forming the fastening strap without any additional assistances (such as, the magnetic material layer in traditional fastening strap structures).

Figure 1:
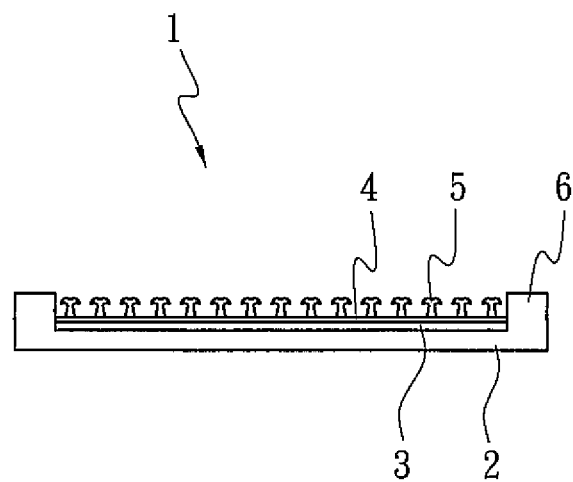
FIG. 1 is a schematic cross-sectional view illustrating a prior art fastening strap structure used in a seat cushion.
Figure 2:
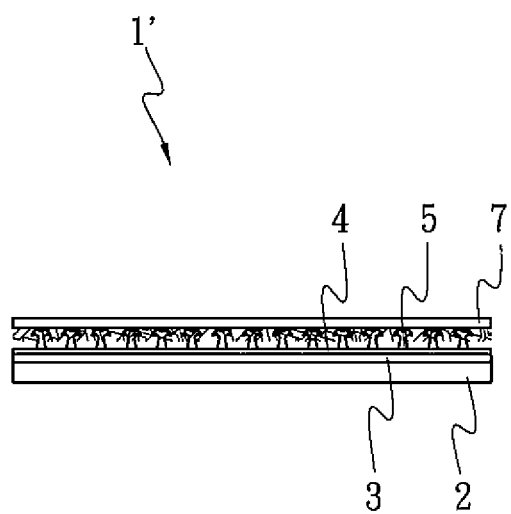
FIG. 2 a schematic cross-sectional view illustrating another prior art fastening strap structure used in a seat cushion.

3. The fastening strap of the present invention utilizes the hooks integrally formed on the fastening strap to bind to the foam article directly, which is opposite to the traditional fastening strap that indirectly binds to the foam article through an intermediate layer (such as, a substrate layer 2 in FIGS. 1 and 2). Therefore, the fastening strap of the present invention is more firmly bound to the foam article than traditional fastening strap.

4. Owing to the unique hollow helical body structure, the fastening strap of the present invention can be arbitrarily bent/curved sideway. This feature of bending/curving sideway is a feature that the existing prior art fastening straps do not posses and the sideway bending/curving function is a function that the existing prior art fastening straps are unable to perform. Because the fastening strap of the present invention has this unique sideway bending/curving characteristic, the fastening strap of the present invention is not only applicable to foam articles having straight attachment portions, but also applicable to foam articles having curved attachment portions with different curvatures and different curving orientations directly and without any additional processing, such as cutting, to the fastening strap. Therefore, the fastening strap of the present invention is a creation that has a great industrial applicability.

Although the present invention has been described above according to the preferred embodiments thereof, this does not mean that the scope of the present invention is limited to specific structures and operation steps described above. In fact, there exist various modifications and variations under the principle and spirit disclosed above. It will be apparent to people skilled in this art that many modifications can be made to the disclosed structures/steps without departing from the scope of the invention. Therefore, it is the intent of the appended claims to cover all such variations and modifications as come within the sprit and scope of this invention.

What is claimed is:

1. A sideway-bendable fastening strap for a foam article, comprising:
    a substantially flat hollow helical body made from a single hook strap and having a first outer surface, a second outer surface, and a plurality of hooks integrally formed on each of the first and second outer surfaces;
    wherein the hook strap is formed by plastic injection process and has a substrate and a plurality of hooks integrally formed on one face of the substrate, and
    wherein the hollow helical body is formed by sequentially and continually folding the hook strap from one end of the hook strap toward the other end of the hook strap along a number folding lines which are parallel with each other and at an angle $\theta$ with respect to a longitudinal axis of the hook strap with the face having the hooks formed thereon facing outward such that the hook strap is plastically and permanently deformed at the folding lines to form a hollow helical body having a width w.

2. A method of manufacturing a fastening strap for a foam article, comprising:
    providing a mold, in which at least one U-shaped grooves are provided at positions of the bottom of the mold corresponding to at least one attachment portion of the foam article and each of the grooves has a width d;
    fitting a fastening strap according to claim 1 in each of the grooves, wherein the width w of the fastening strap is selected such that the width d of the groove is smaller than the width w of the fastening strap such that when the fastening strap is fitted in the groove the fastening strap is compressed laterally and is kept in the groove by means of the returning force generated by the configuration of the hollow helical body of the fastening strap and the elasticity of the plastic material of the fastening strap; and
    injecting the mold with a foam material to perform a foam molding process, in which the foam material penetrates into the space among hooks so as to firmly bind the fastening strap to the foam article to be formed and become the at least one attachment portion.

3. A foam article comprising:
    a foam body; and
    at least one attachment portion, wherein the at least one attachment portion includes a fastening strap according to claim 1 bound to the foam body.

* * * * *